United States Patent [19]

Nakajima et al.

[11] Patent Number: 5,436,737
[45] Date of Patent: Jul. 25, 1995

[54] IMAGE READING DEVICE HAVING A PLURALITY OF IMAGE SENSORS ARRANGED IN A MAIN SCANNING DIRECTION AND CAPABLE OF PRODUCING CONTINUOUS IMAGE DATA

[75] Inventors: Yoshihiro Nakajima; Akihiro Takada, both of Osaka, Japan

[73] Assignee: Mita Industrial Co., Ltd., Osaka, Japan

[21] Appl. No.: 9,539

[22] Filed: Jan. 27, 1993

[30] Foreign Application Priority Data

Jan. 31, 1992 [JP] Japan ................................ 4-016305

[51] Int. Cl.[6] ........................................... H04N 1/193
[52] U.S. Cl. ................................... 358/494; 358/474
[58] Field of Search ............... 358/471, 474, 482, 483, 358/486, 487, 494, 497; H04N 1/17, 1/193, 1/04; 382/44, 67

[56] References Cited

U.S. PATENT DOCUMENTS 3,962,681  6/1976  Regua et al.
4,439,790  3/1984  Yoshida ........................ 358/480
4,532,551  7/1985  Kurata et al. ................. 358/494
4,776,031 10/1988  Mita ............................. 358/494
4,891,690  1/1990  Hasegawa et al. ............ 358/494

FOREIGN PATENT DOCUMENTS 0292253 11/1988 European Pat. Off.
2202265  2/1990 Japan.

OTHER PUBLICATIONS

Patent Abstracts of Japan, vol. 14, No. 489 (E-994) 24 Oct. 1990 & JP-A-22 02 265 (Fuji Xerox Co Ltd) 10 Aug. 1990 *abstract*.

Primary Examiner—Edward L. Coles, Sr.
Assistant Examiner—Kim Yen Vu
Attorney, Agent, or Firm—Jordan and Hamburg

[57] ABSTRACT

An image reading device moves relative to a document in a lengthwise direction of the document so as to read a document image, and is provided with first and second image sensors arranged in line in a widthwise direction of the document, each image sensor including first to n-th photoelectric conversion elements arranged in line in the widthwise direction, each photoelectric conversion element receiving reflected light from the document and generating image data corresponding to the intensity of the received reflected light, and the first photoelectric conversion element of the second image sensor positioned following the n-th photoelectric conversion element of the first image sensor; a scanner for causing the lines of photoelectric conversion elements of the respective image sensors to scan in a specified direction at a specified speed; and a data processor for processing the image data from the n-th photoelectric conversion element of the first image sensor and the image data from the first photoelectric conversion element of the second image sensor so that these image data become continuous in the lengthwise direction. Accordingly, the image reproduced from the read image data is allowed to exhibit satisfactory reproducibility and appearance.

4 Claims, 16 Drawing Sheets

SUB-SCANNING DIRECTION

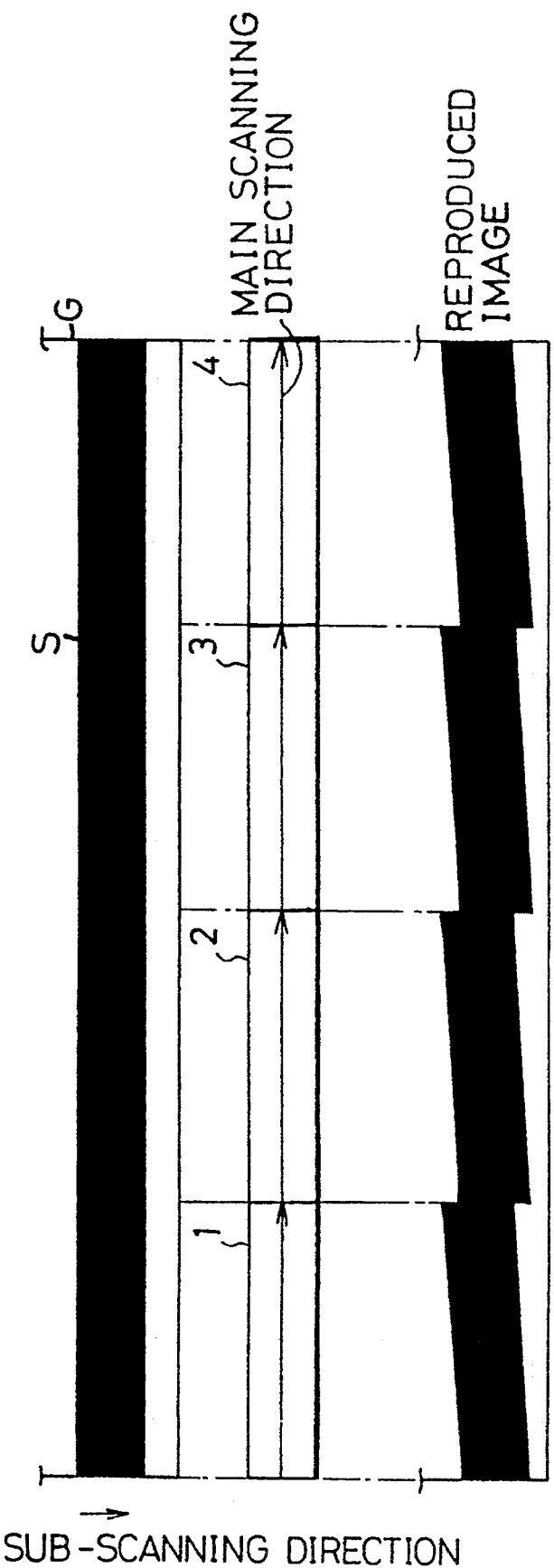

IMAGE READING DEVICE HAVING A PLURALITY OF IMAGE SENSORS ARRANGED IN A MAIN SCANNING DIRECTION AND CAPABLE OF PRODUCING CONTINUOUS IMAGE DATA

BACKGROUND OF THE INVENTION AND RELATED ART STATEMENT

This invention relates to an image reading device which includes a plurality of image sensors arranged in a widthwise direction of a document so as to scan sequentially from one lateral end to the other lateral end in the widthwise direction to read a document image, and outputs read data to such apparatus as image forming apparatus.

Conventionally, in an image reading device for use in an image forming apparatus such as a facsimile machine, there is arranged in a widthwise direction of a document an image sensor including a photoelectric conversion element array in which photoelectric conversion elements such as photodiodes are arranged in line. The image reading device reads a document image by causing the image sensor to scan in the widthwise direction (hereinafter referred to as a main scanning) and by moving the image sensor or document relatively to scan in a lengthwise direction of the document (hereinafter referred to as a sub-scanning). Since there is a limit in the number of photoelectric conversion elements mounted on a single image sensor, the number of photosensors and the length of the image sensor become insufficient in the case where the document width is large. Thus, in this case, a plurality of image sensors are arranged side by side according to the document size so as to scan in the same direction and synchronously to read the document image.

In this way, the array of photoelectric conversion elements sequentially scan so as to read the document image. Accordingly, there is a time difference between a reading timing of the first photoelectric conversion element and that of the last one. On the other hand, as described above, the image sensor and the document are moved relatively in the lengthwise direction of the document while the photoelectric conversion element array is being scanned. Consequently, an image data will have a discontinuity at a portion corresponding to a boundary between the juxtaposed image sensors. For example, in the case where a straight line S on a document G is read by image sensors 1 to 4 as shown in FIG. 10, the output data of the straight line S becomes discontinuous due to a difference in scanning time between two successively operated image sensors. Consequently, as shown in FIG. 10, an image reproduced is not accurately reproduced. Also, the appearance of the reproduced image is deteriorated.

As a measure against this problem, there has been proposed an image reading device in which adjacent image sensors are arranged such that main scanning directions thereof are alternately opposite to each other so as to correspond the reading timings at boundaries between two successively operated image sensors, to thereby eliminate the aforementioned discontinuity in the output data from the image reading device (Japanese Unexamined Patent Publication No. 2-202265).

However, since the main scanning directions of adjacent image sensors are alternately opposite to each other in the image reading device disclosed in the above publication, wires are connected to one end of the respective image sensors alternately at opposite positions, thereby complicating the wiring. Further, when the reading tracks of the respective image sensors are connected, the reproduced image is bent, thereby deteriorating the reproducibility and appearance. In order to solve this bending of the image, it is disclosed to arrange and incline the image sensors by the inclination of the reading tracks of the respective image sensors. However, this necessitates adjustment of the inclination of the respective image sensors, thus costing time and labor. Also, an adjusting operation requires skills since the inclination is adjusted by an extremely fine angle.

In addition, the above image reading device including a plurality of image sensors adopts a fabricating method of connecting manually the respective image sensors to one another and fixing the connected image sensors on a long rectangular substrate with adhesive or the like. Thus, there have been cases where the image sensors are fixed while being slightly displaced in the lengthwise direction of the document at the points of connection.

The displacement between the image sensors turns out to be a displacement of the image at the connections between the image sensors in the case where image data are output from the image sensors.

SUMMARY OF THE INVENTION

In view of the problems residing in the prior art, it is an object of the invention to provide an image reading device capable of reproducing a document image in a satisfactory appearance.

Accordingly, the invention is directed to an image reading device which moves relative to a document in a lengthwise direction of the document so as to read a document image. The image reading device comprises first and second image sensors arranged in line in a widthwise direction of the document, each image sensor including first to n-th photoelectric conversion elements arranged in line in the widthwise direction, each photoelectric conversion element receiving reflected light from the document and generating image data corresponding to the intensity of the received reflected light and the first photoelectric conversion element of the second image sensor positioned following the n-th photoelectric conversion element of the first image sensor; scan means for causing the lines of photoelectric conversion elements of the respective image sensors to scan in a specified direction at a specified speed; and data processing means for processing the image data of the first and the second image sensors so that the image data from the n-th photoelectric conversion element of the first image sensor and the image data from the first photoelectric conversion element of the second image sensor become continuous in the widthwise direction.

With the image reading device thus constructed, the image data read by the first and second image sensors exhibits discontinuity at a boundary between the first and second image sensors by an amount corresponding to a scanning time required for the scanning of the photoelectric conversion elements to make one run. This discontinuity is eliminated by the data processing means.

The scan means may include scan control means for causing the lines of photoelectric conversion elements of the respective image sensors to scan in a scanning direction from the first to the n-th photoelectric conversion elements cyclically and synchronously. The data processing means may include memory means consisting essentially of first, second, third, and fourth memory blocks; write means for writing the image data read by the respective image sensors in the memory means in the scanning direction, the write means writing the image data read by the first image sensor during a first scanning in the first memory block writing the image data read by the second image sensor during the first scanning in the second memory block, writing the image data read by the first image sensor during a second scanning in the third memory block, and writing the image data read by the second image sensor during the second scanning in the fourth memory block; and read means for reading the image data stored in these memory blocks, the read means first reading the image data stored in the in second memory block in the writing order, second reading the in image data stored in the first and fourth memory blocks synchronously in the writing order, and third reading the image data stored in the third memory block in the writing order.

With this arrangement, the image data read by the first and second image sensors in the first scanning is stored in the first and second memory blocks, and the image data read thereby in the second scanning is stored in the third and fourth memory blocks. These image data exhibit the discontinuity by a scanning time required for the scanning of the line of photoelectric conversion elements to make one run between the n-th photoelectric conversion element of the first image sensor and the first photoelectric conversion element of the second image sensor. This discontinuity is eliminated at least by reading the image data stored in the first and fourth memory blocks synchronously.

Further, the scan means may advantageously include first scan means for causing the line of first to n-th photoelectric conversion elements of the first image sensor to scan at the specified speed, and second scan means for causing the line of first to n-th photoelectric conversion elements of the second image sensor to scan at the specified speed. The data processing means may advantageously include output means for sending scanning start signals to the first and second scan means so as to cause the first and second scan means to start the scanning, and scan control means for controlling the first and second scan means so that the scanning by the second scan means is started following completion of the scanning by the first scan means.

With this arrangement, the n-th photoelectric conversion element of the first image sensor and the first photoelectric conversion element of the second image sensor scan continuously. Thus, the image data does not exhibit discontinuity.

The invention is also directed to an image reading device which moves relative to a document in a lengthwise direction of the document so as to read a document image, the apparatus comprising first and second image sensors arranged in line in a widthwise direction of the document, each image sensor including first to n-th photoelectric conversion elements arranged in line in the widthwise direction, each photoelectric element receiving reflected light from the document and generating image data corresponding to the intensity of the received reflected light; first scan means for causing the line of photoelectric conversion elements of the first image sensor to scan in a specified direction at a specified speed: second scan means for causing the line of photoelectric conversion elements of the second image,sensor to scan in another specified direction at the same speed as the first scan means: and scan control means for controlling the first and second scan means so as to offset a displacement of the second image sensor relative to the first image sensor in the lengthwise direction of the document.

The image reading device thus constructed offsets the displacement of the image due to the displacement between the first and second image sensors in the lengthwise direction of the document.

The scan control means may include output means for sending scanning start signals simultaneously to the first and second scan means so as to cause the first and second scan means to start the scanning; measurement means for measuring a time required to move relatively a displaced amount of the second image sensor relative to the first image sensor in the lengthwise direction of the document; and delay means for sending the scanning start signal to the second scan means at a timing delayed by the measured time from the one at which the scanning start signal is sent to the first scan means.

With this arrangement, there is measured the time required to move relatively the displaced amount of the second image sensor relative to the first image sensor in the lengthwise direction of the document. The scanning by the second image sensor is delayed relative to the scanning by the first image sensor by the measured time, thereby offsetting the displacement of the image due to the displacement between the respective image sensors.

Further, there may be provided three or more image sensors arranged in the widthwise direction of the document, each image sensor including first to n-th photoelectric conversion elements arranged in line in the widthwise direction of the document.

These and other objects, features and advantages of the present invention will become more apparent upon a reading of the following detailed description and accompanying drawings.

BRIEF DESCRIPTION OF THE DRAWINGS

FIGS. 4A to 4I are diagrams showing exemplary operations of the first image reading device. FIG. 4A showing a positional relationship between image sensors and an image of the document to be read. FIGS. 4B to 4E showing operations of producing one-bit image data, and FIGS. 4F to 4I showing operations of producing multi-bit image data;

FIG. 10 is a diagram showing an image reproduced based on data obtained by an image reading device of the prior art.

DETAILED DESCRIPTION OF PREFERRED EMBODIMENTS OF THE INVENTION

Figure 1:
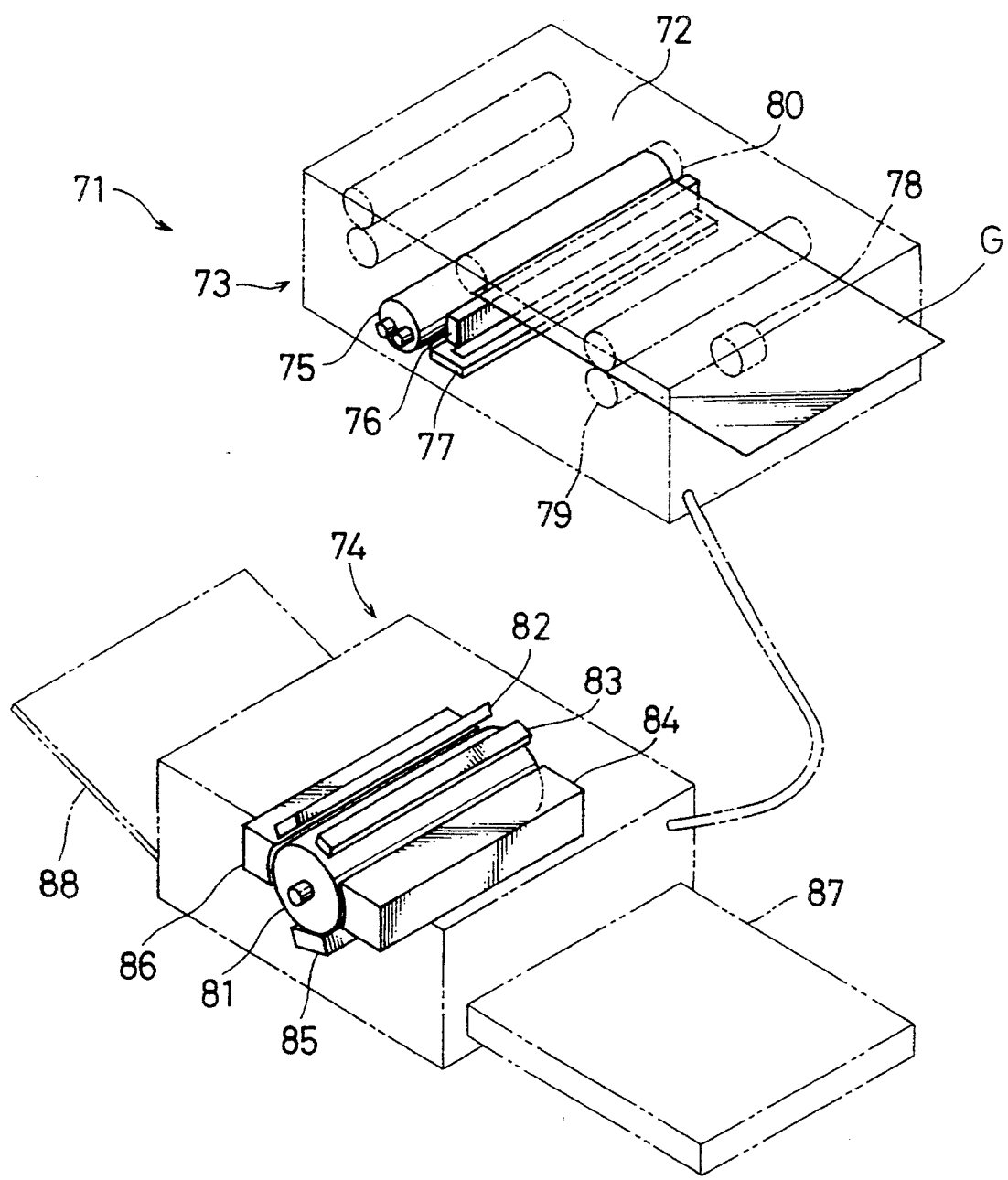
FIG. 1 is a perspective view showing a schematic construction of an image forming apparatus incorporating an image reading device according to the invention.

There will be first described a schematic construction of an image forming apparatus incorporating an image reading device according to the invention with reference to FIG. 1.

An image forming apparatus 71 is provided with an image reading unit 73 and an image forming unit 74. In FIG. 1, the image reading unit 73 and the image forming unit 74 are separated so as to facilitate the understanding of their construction.

The image reading unit 73 includes an exposure lamp 75 for exposing a document, an optical system having a line magnification forming element 76 such as a rod lens array for focusing a reflected light from the document on an image sensor array to be described later, and the like, and an image reading device having the image sensor array 77 for reading the image formed by the reflected light as image data.

The image forming unit 74 includes a photosensitive member 81, a charger 82, an LED array 83, a developing device 84, a transfer device 85, a cleaner 86, etc.

An image forming operation will be described summarily next. A document G is fed by a feed roller 78. The document G reflects light from the exposure lamp 75 while being transported by a pair of transport rollers 79 and a transport roller 80. This reflected light converged and focused on the image sensor array 77 by the line magnification focusing element 76. On the other hand, the surface of the photosensitive member 81 is exposed to an image light emitted from the LED array 83 based on the image data read by the image sensor array 77 after being charged uniformly by the charger 82, and thereby an electrostatic latent image is formed thereon. Charged toner is supplied to the photosensitive member 81 from the developing device 84 to deposit on the electrostatic latent image to thereby form a toner image.

On the other hand, a sheet is fed to the image forming unit 74 by unillustrated feed means from a cassette 87, and the toner image is transferred to the sheet by the transfer device 85. The sheet is separated from the photosensitive member 81, and is discharged onto a discharge tray 88 from the image forming unit 74 after having the toner image fixed thereto. The cleaner 86 cleans the toner residual on the surface of the photosensitive member 81 after the image forming operation.

There will be described a first image reading device according to the invention next with reference to FIGS. 2 to 4.

Figure 2:
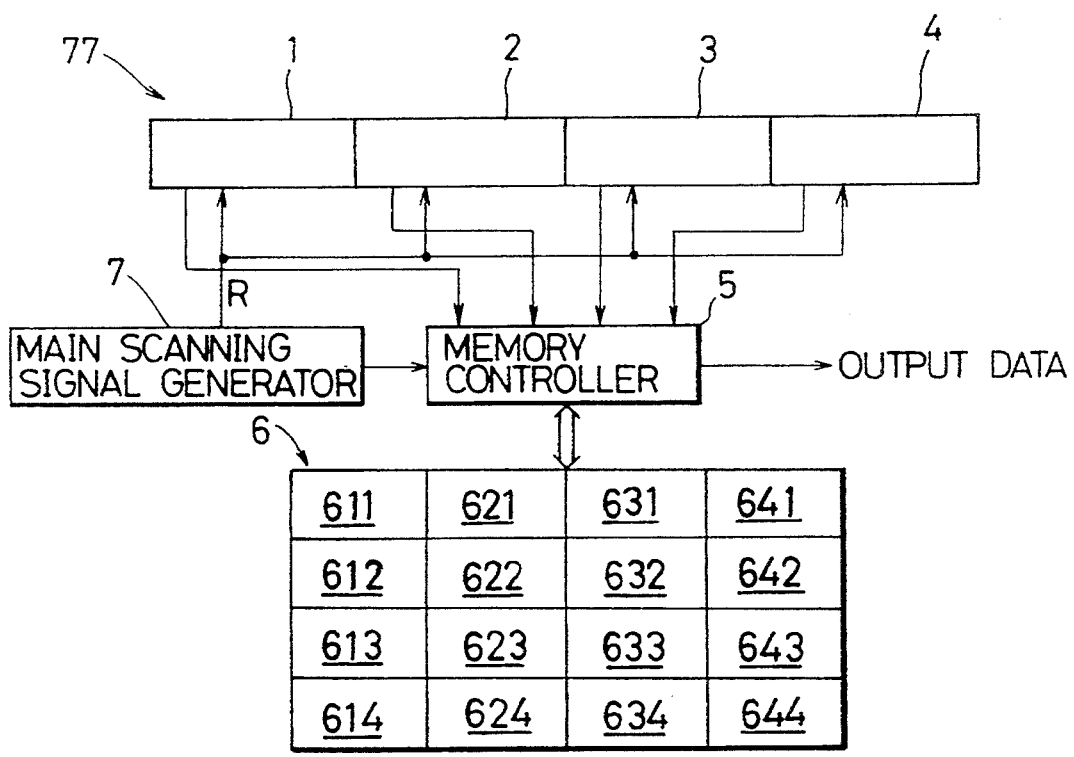
FIG. 2 is a block diagram showing a construction of a first image reading device according to the invention.

The image reading device is, as shown in FIG. 2, provided with the image sensor array 77 including scanning type image sensors 1 to 4, a memory controller 5, a memory 6, a main scanning signal generator 7, etc. The image reading device is adapted for reading an image of the document while scanning the document being transported in a lengthwise direction. Since the document is scanned relatively in the sub-scanning, it may be appropriate to fix the document while moving the optical system and image sensor array.

The image sensor array 77 includes four image sensors 1 to 4 arranged side by side in a main scanning direction. Each of the image sensors 1 to 4 includes n photosensors such as phototransistors arranged side by side in the main scanning direction which receive the reflected light from the document and read the document image every photosensor. For example, an image of a document of A0 size can be read by the image sensor array 77.

Each of the photosensors provided in the image sensors 1 to 4 outputs light reception data (analog data) according to a light reception level to the memory controller 5. The photosensors of the image sensor 1 are scanned sequentially from the first one to the n-th one each time in accordance with a main signal R from the main scanning signal generator 7, and the light reception data of the respective photosensors is output to the memory controller 5. The photosensors of the other image sensors 2 to 4 are scanned in the same way.

The main scanning signal generator 7 outputs the main scanning signals R synchronously to the respective image sensors 1 to 4 so that the photosensors of the image sensors 1 to 4 are scanned. Upon receipt of these main scanning signals, the light reception data are output synchronously from the respective photosensors of the image sensors 1 to 4 to the memory controller 5. The memory controller 5 reads the light reception data sequentially from the image sensors 1 to 4; converts the same into digital data (image data); and stores the image data in correspondence with respective blocks of the memory 6 as described later.

The memory 6 includes a plurality of memory blocks 611 to 644. Each of the memory blocks 611 to 644 has the same number of memory elements (n memory elements) for storing image data from the corresponding photosensors of each image sensor.

The memory blocks 611 to 614 are adapted for storing image data read by four consecutive main scannings of the image sensors 1 to 4. Specifically, the image data read by the four consecutive main scannings of the image sensor 1 is stored in the memory blocks 611 to 614. Likewise, the image data read by the four consecutive main scannings of the image sensors 2 to 4 are stored respectively in the memory blocks 621 to 624, 631 to 634, and 641 to 644.

The memory controller 5 reads the respective image data stored in the memory blocks 611 to 644 synchronously in a specified order to be described later, and outputs the same as output data to the image forming unit 74.

The memory blocks 611 to 644 from which previous image data have been read are sequentially written with newly read image data. For example, when the image data obtained in the first main scanning is read from the memory block 611, the image obtained in the fifth main scanning is written in the memory block 611.

Figure 4A:
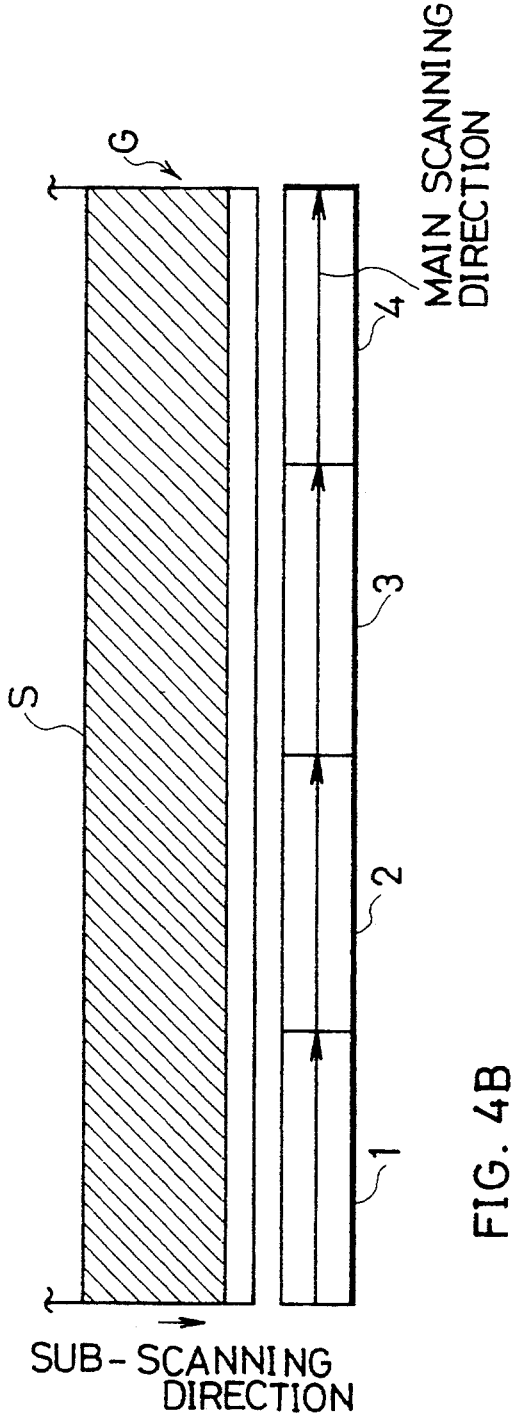

Further, more specifically, there will be described exemplary operations of the image reading device next with reference to FIGS. 4A to 4I. The following description will be made with reference to a case where a white document G having a black straight line S in parallel with the main scanning direction is read as shown in FIG. 4A. Also, it is assumed that reading of the straight line S is started in the i-th main scanning and completed in the (i+2)th main scanning.

First, there will be described operations of obtaining image data represented by one bit, i.e., white and black data, and reproducing a monotone image. The memory controller 5 diiigitalizes the output from each photosensor to image data in the form of one bit. Each of the memory blocks 611 to 644 has the 1-th to n-th memory elements. Each memory element is written with one-bit image data.

When the i-th main scanning is carried out upon receipt of the main scanning signal R from the memory controller 5, the reading of the straight line S on the document G by the image sensors 1 to 4 is started. The memory controller 5 causes the lead image data to be written in the memory blocks 611, 621, 631, and 641.

Figure 4B:
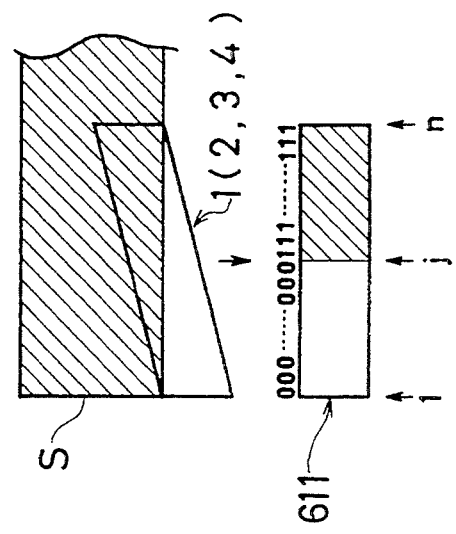
Figure 4C:
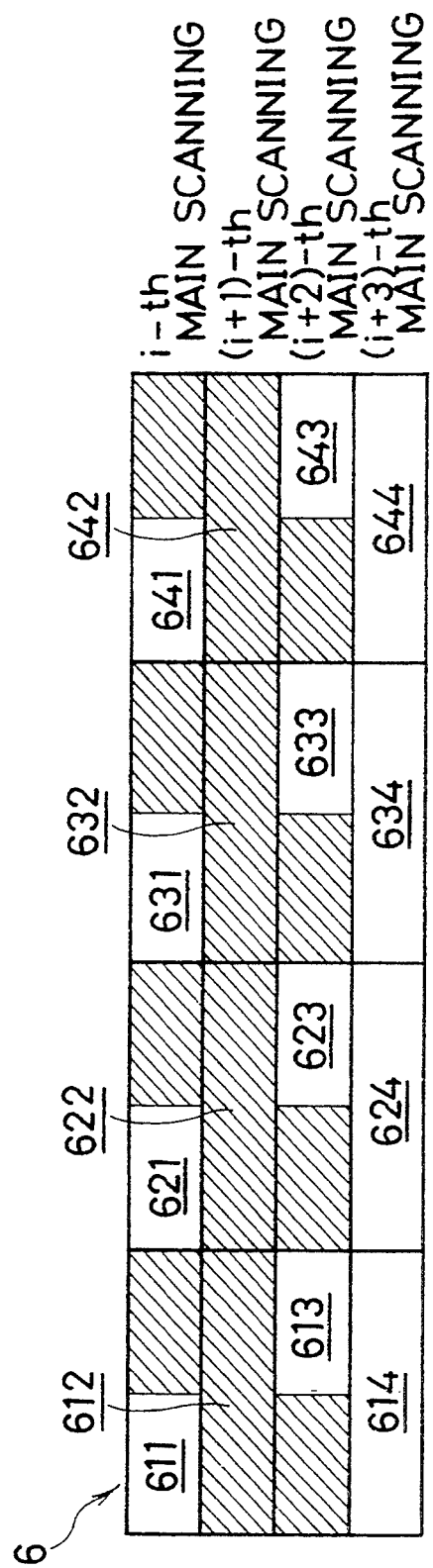

In this time, the document G is moved in the sub-scanning direction. As shown in FIG. 4B, consequently, the reading area of each image sensor becomes inclined with respect to the straight line S. The read image data is digitalized in the binary basis by the memory controller 5. Thereafter, the image data (hereinafter referred to as "white data") corresponding to the white portion are written in the 1-th to j-th memory elements of the memory block 611 and the image data (hereinafter referred to as "black data") corresponding to the straight line S in the (j+1)th to n-th memory elements of the memory block 611. The white data is represented by the digit "0" while the black data is represented by the digit "1". In other words, each memory element is written with binary code. The image data obtained by the other image sensors 2 to 4 are digitalized and written in the same way. Accordingly, the memory blocks 611, 621, 631, 641 have the white data in their respective 1-th to j-th memory elements and the black data in their respective (j+1)th to n-th memory elements.

Next, when the (i+1)th main scanning is carried out, the black data of the straight line S are written in the memory blocks 612, 622, 632, and 642 respectively.

In the (i+2)th main scanning is carried out, similarly to the writing in the i-th main scanning, the black data are written in the 1-th to j-th memory elements of each of the memory blocks 613, 623, 633, and 643 while the white data are written in the (j+1)th to n-th memory elements thereof. The reading of the straight line S is completed.

In the (i+3)th main scanning, in the memory blocks 614, 624, 634, 641 are entirely written the white data from the image sensors 1 to 4.

In the (i+4)th main scanning the image data from the image sensors 1 to 4 are written in the memory blocks 611, 621, 631, and 641. Subsequently, the above-mentioned operations follow. In this way, the memory 6 has the image data in FIG. 4C. in each memory in FIG. 4C block of the memory 6 as shown in the memory 6

Figure 4D:
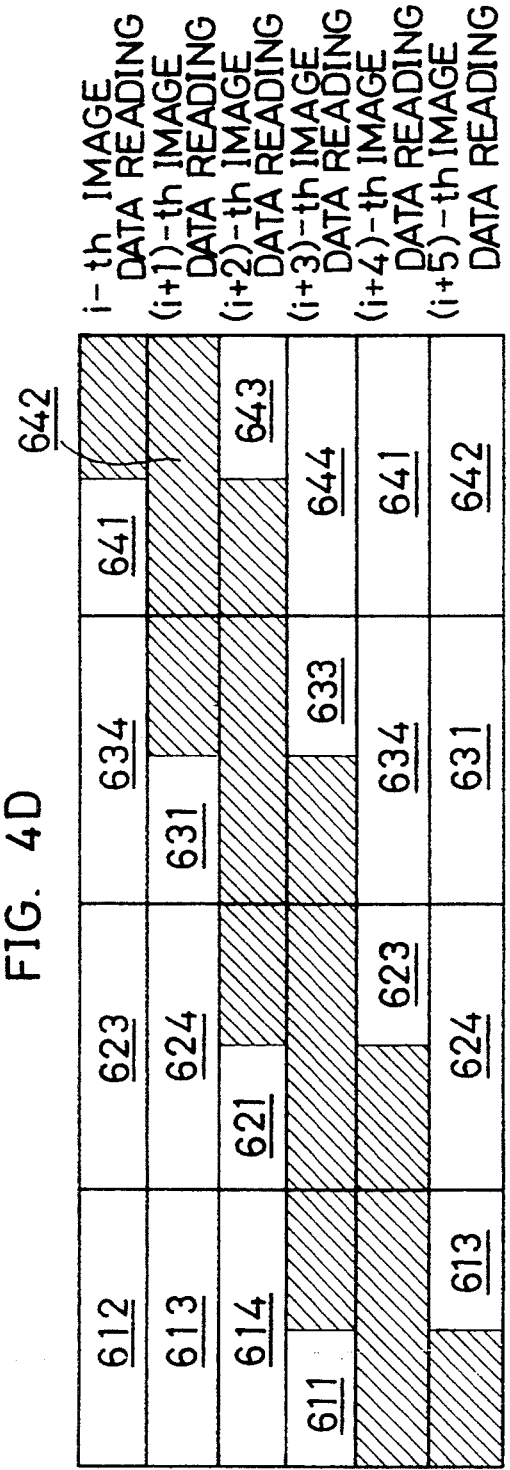

Next, reading in the memory 6 of the image data written will be described with reference to FIG. 4D. It should be noted that in FIG. 4D, memory blocks which are read in the same timing are arranged in the same line.

Immediately after completion of the image data writing operation in the i-th main scanning, the reading of the written i-th image data from the memory 6 is started. During this i-th image data reading operation, the image data are read from the memory blocks 612, 623, 634, and 641. The memory blocks 612, 623, 634 respectively have the white data obtained in the (i−3), (i−2), and (i−1)th main scannings.

Subsequently, immediately after completion of the (i+1)th image data writing operation, the (i+1)th image data reading operation is carried out to read the image data from the memory blocks 613, 624, 631, and 642. The memory blocks 613 and 624 respectively have the white data obtained in the (i−2) and (i−1)th main scannings.

Subsequently, immediately after completion of the (i+2)th image data writing operation, the (i+2)th image data reading operation is carried out to read the image data from the memory blocks 614, 621, 632, and 643. The memory block 614 has the white data obtained in the (i−1)th main scanning.

Further, after completion of the (i+3)th image data writing operation, the (i+3)th image data reading operation is carried out to read the image data from the memory blocks 611, 622, 633, and 644. Subsequently, after completion of the (i+4)th image data writing operation, the (1+4)th image data reading operation is carried out to read the image data from the memory blocks 612, 623, 634, and 641. After completion of the (i+5)th image data writing operation, the (1+5) th image data reading operation is carried out to read the image data from the memory blocks 613, 624, 631, and 642.

Figure 4E:
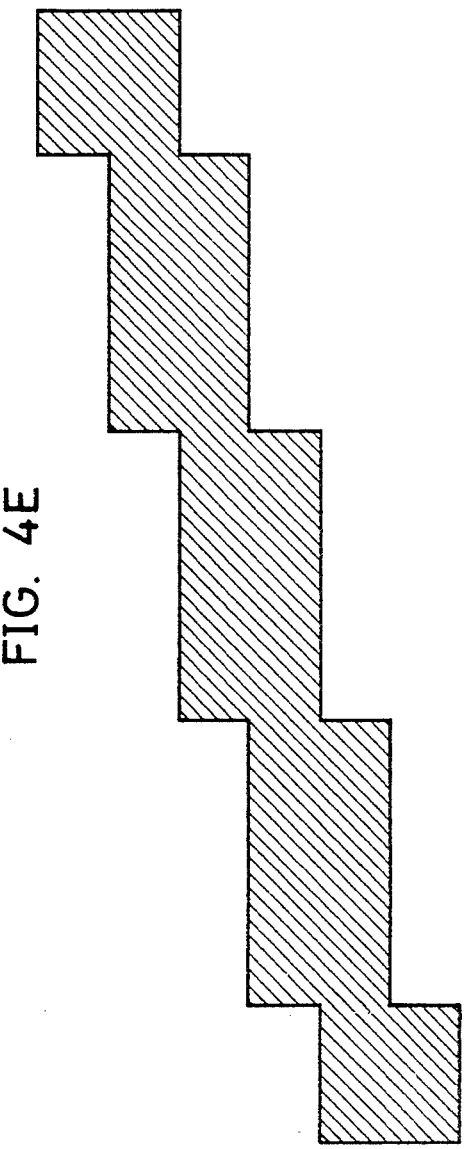

As shown in FIG. 4E, consequently, an image having no discontinuity is reproduced.

Second, there will be described operations of obtaining image data represented by multi-bit, and reproducing a halftone image. In this embodiment, the memory controller 5 digitalizes the output from each photosensor to image data in the form of eight bits. Each of the memory blocks 611 to 644 is written with eight-bit image data. This eight-bit reading operation is basically the same as the one-bit reading operation except for the memory block capable of storing eight-bit data.

Figure 4F:
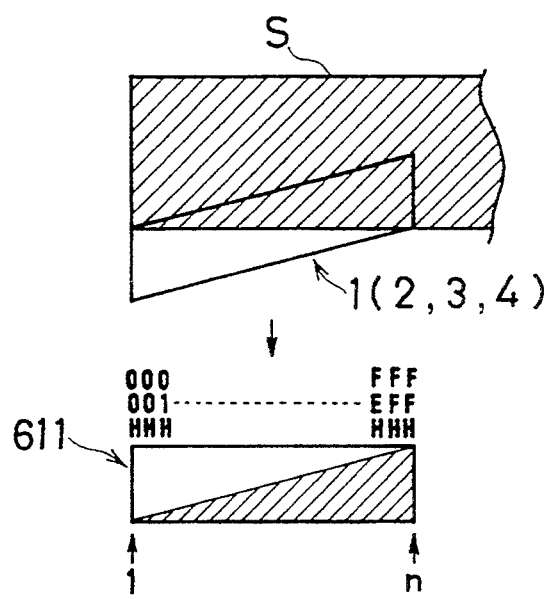

The reading area of each image sensor becomes inclined with respect to the straight line S, similarly to the above-mentioned one-bit reading. The respective photosensors' outputs of each image sensor are digitalized into 8-bit image data each of which are in turn written in memory elements of each memory block. Specifically, as shown in FIG. 4F, in the case of writing the image data obtained in the i-th scanning in the memory block 611, the respective image data are written in the 1-th to n-th memory element in the form of binary codes "00H" to "FFH". The binary code "00H" represents "white". The binary code "FFH" represents "black". The binary codes between "00H" and "FFH" represent half tone.

Figure 4G:
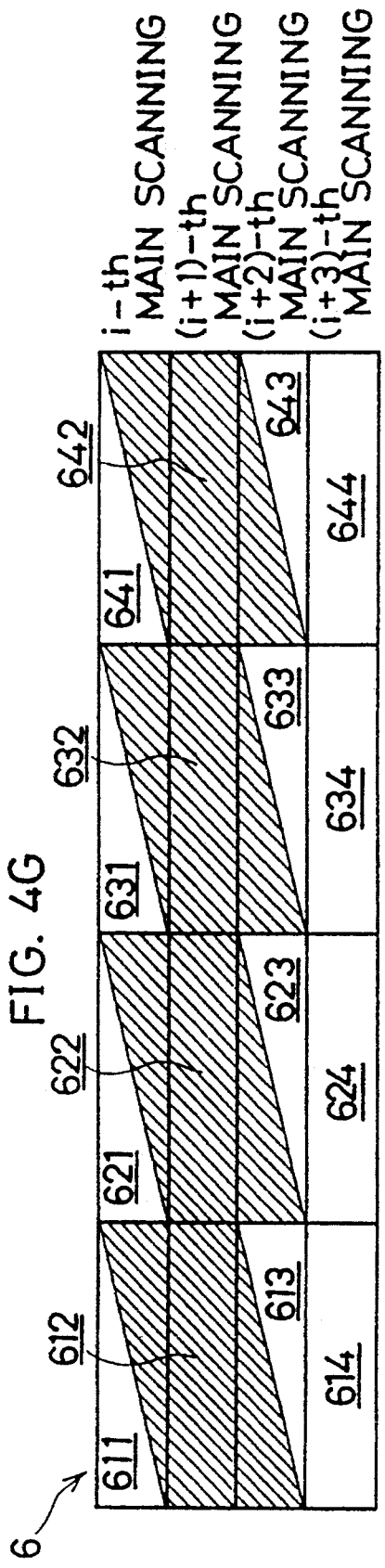
Figure 4H:
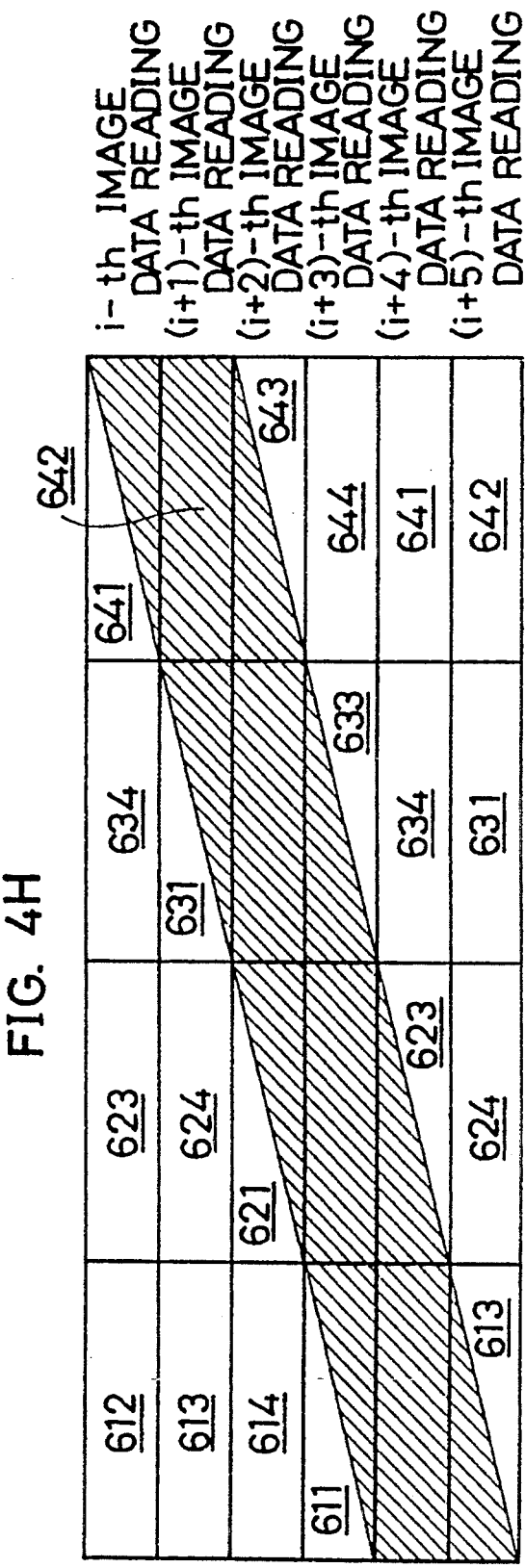
Figure 41:
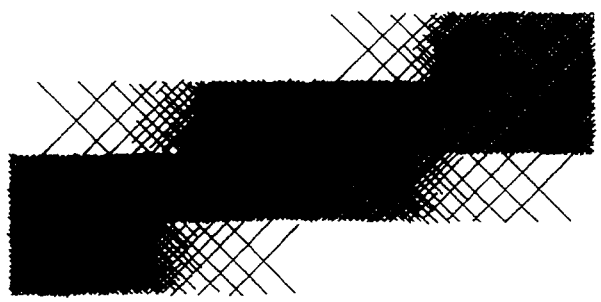

As shown in FIG. 4G, the image data obtained in the i-th to (i+3)th main scannings are written in the corresponding memory blocks of the memory 6 in the same way as the one-bit reading. The written image data are read in the order shown in FIG. 4H. FIG. 4I shows an image reproduced based on the 8-bit data.

Accordingly, although being read by the image sensors 1 to 4, the straight line S is reproduced into an image having no discontinuity as shown in FIG. 4I. Thus, an image having the satisfactory reproducibility and appearance can be formed.

The reproduced image is oblique relative to the main scanning direction as shown in FIG. 4I. However, the length in the sub-scanning direction of the photosensors of the image sensor is so much smaller than the length in the main scanning direction of the image sensor that the inclination is neglectably small and thus will not stand as a hindrance to a practical use.

Further, it may be appropriate to arrange a memory sectioned for the respective image sensors 1 to 4. The image data stored in the sectioned memory are output to the image forming unit 74 in a parallel manner while carrying out the image data reading operation similar to the above.

The number of memory blocks provided in the memory 6 is not limited to the above. It will be sufficient to provide memory blocks equal to or more than squared by the number of image sensors, that is, n×n blocks.

Figure 2A:
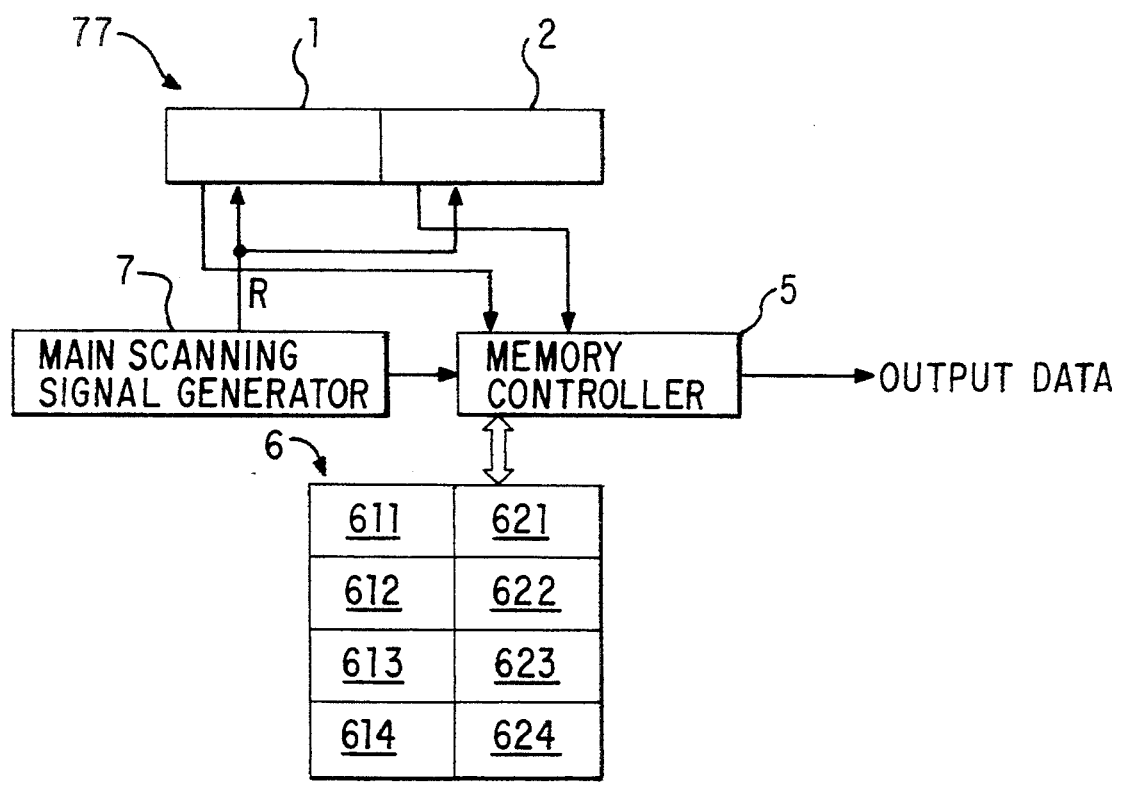
FIG. 2A is a block diagram similar to FIG. 2 but showing another embodiment.
Figure 3:
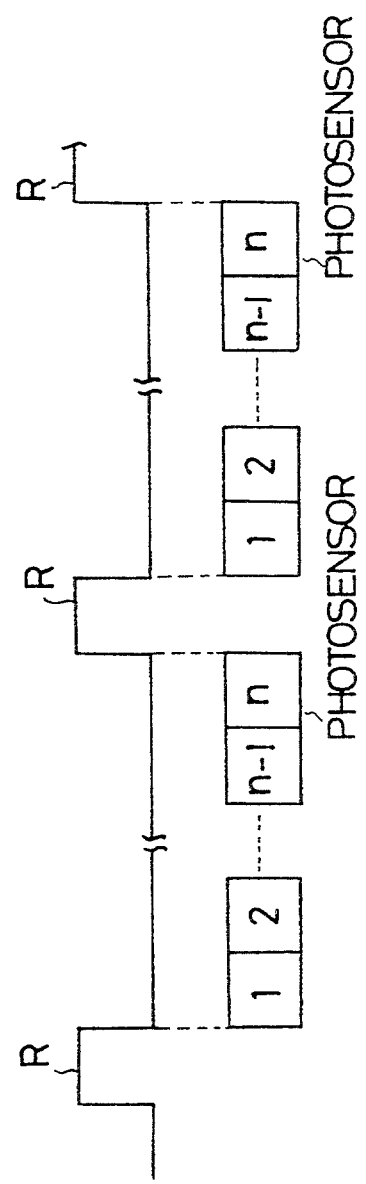
FIG. 3 is a timing chart showing a reading timing of an image sensor.

FIG. 2A shows another embodiment similar to the embodiments of FIGS. 2-4 and which operates like the embodiment of FIGS. 2-4, except that two image sensors 1A and 2A are used in FIG. 2A, rather than the four image sensors shown in FIG. 2.

There will be described a second image reading device according to the invention next with reference to FIGS. 5 to 9.

Figure 5:
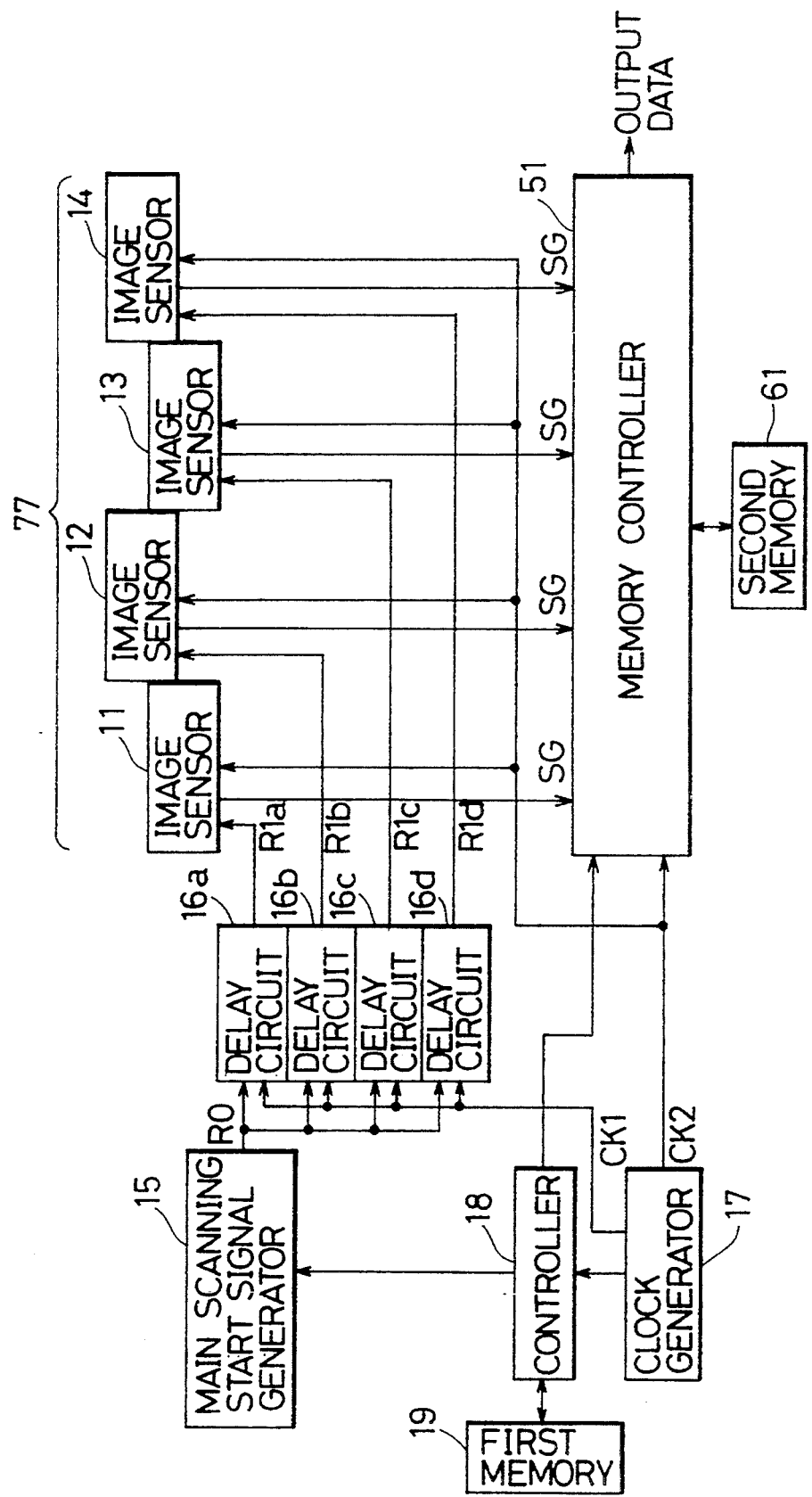
FIG. 5 is a block diagram showing a construction of a second image reading device according to the invention.

As shown in FIG. 5, this image reading device is provided with an image sensor array 77 including scanning type image sensors 11 to 14, a main scanning start signal generator 15, delay circuits 16a, 16b, 16c, 16d, a clock generator 17, a controller 18, first and second memories 19, 61, a memory controller 51, etc. This image sensor array 77 is adapted for reading a document image by scanning a document relatively into a sub-scanning direction.

The image sensor array 77 includes four image sensors 11 to 14 arranged side by side in a main scanning direction. Each of the image sensors 11 to 14 includes n photosensors such as phototransistors arranged side by side in the main scanning direction which receive the reflected light from the document and read the document image by the photosensor. For instance, an image of a document of A0 size can be read by the image sensor array 77. These image sensors 11 to 14 are fixed on a substrate in the form of, e.g. along rectangle, using adhesive after connected to one another.

Each of the photosensors provided in the image sensors 11 to 14 outputs a light reception data SG to the memory controller 51. The respective image sensors 11 to 14 output the light reception data SG from the first photosensor put to the memory controller 51 in synchronism with a synchronization signal CK2 each time delayed main scanning start signals R1a to R1d to be described later are received.

The main scanning start signal generator 15 sends main scanning start signals R0 to the delay circuits 16a to 16d in a specified order so as to cause the image sensors 11 to 14 to start the main scanning. The delay circuits 16a to 16d are provided between the image sensors 11 to 14 and the main scanning start signal generator 15 respectively, and adapted for sending the delayed main scanning start signals R1a to R1d delayed by a predetermined period from the main scanning start signals R0 to the corresponding image sensors 11 to 14. Accordingly, the main scanning start timings of the respective image sensors 11 to 14 are delayed by the predetermined period. The clock generator 17 sends a clock signal CK1 and the synchronization signal CK2 respectively to the delay circuits 16a to 16d and the memory controller 51.

Figure 6:
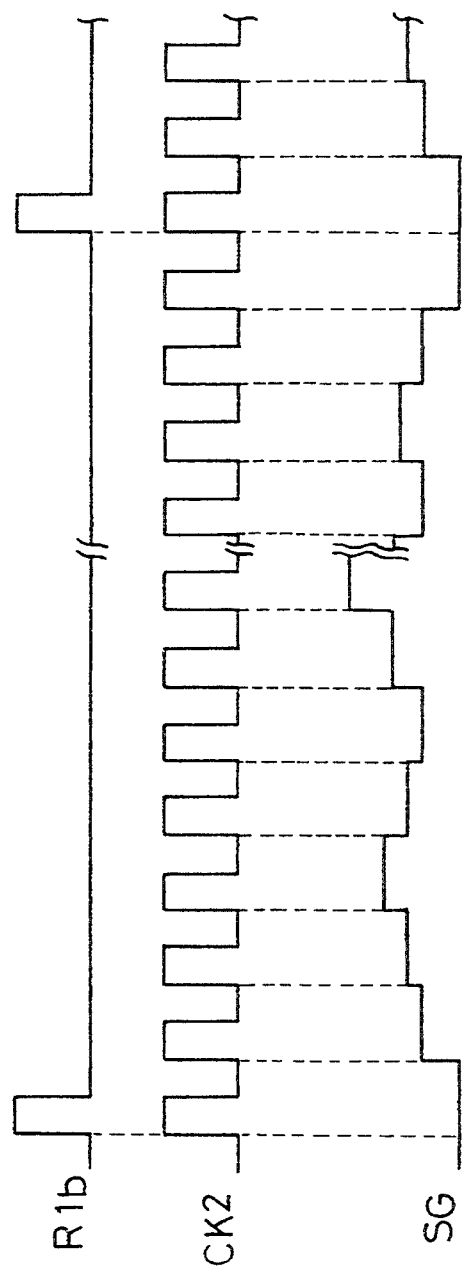
FIG. 6 is a timing chart showing a reading timing of an image sensor.

The controller 18 includes CPU or the like, and controls the main scanning start signal generator 15, the memory controller 51, etc. The first memory 19 includes a ROM or the like, and stores a control program. The second memory 61 includes a RAM or the like, and stores the image data and various other data. The memory controller 51 converts the light reception data SG sent in time series from the respect image sensors 11 to 14 in synchronism with the synchronization signal CK2 as shown in FIG. 6 to a digital image data according to a method similar to the one described with respect to the memory controller 5 in the first embodiment. Then, the memory controller 51 causes the second memory 61 to store the converted image data temporarily or outputs the same to the image forming unit 74. The main scanning start signal R0 synchronizes with the clock signal CK1.

Figure 7:
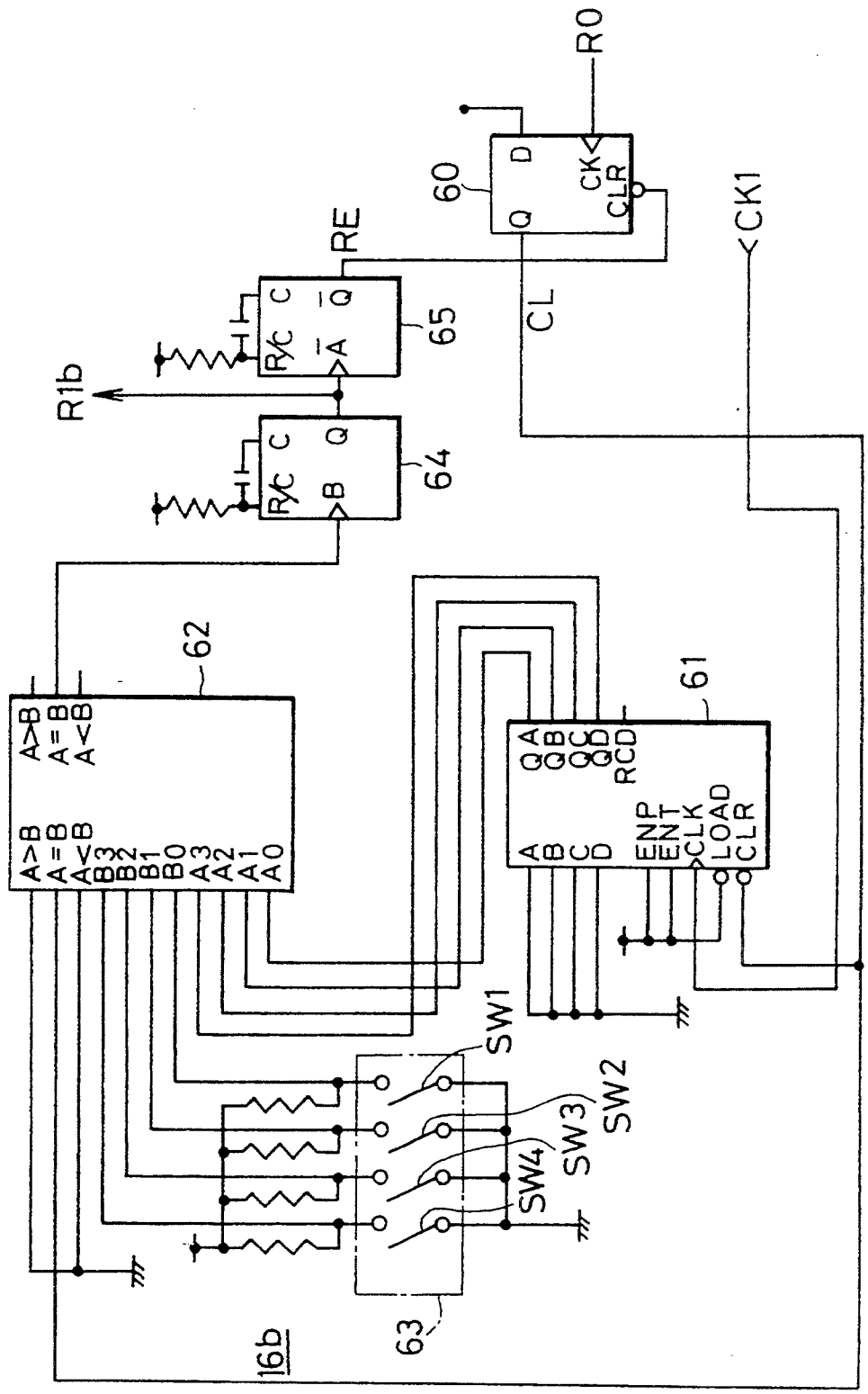
FIG. 7 is a circuit diagram showing an exemplary delay circuit.

Subsequently, examples of the delay circuits 16a to 16d will be described with reference to FIG. 7 which is a circuit diagram of the delay circuit 16d.

Each of the delay circuits 16a to 16d includes a D flip-flop 60, a counter 61, a comparator 62, a delay setting unit 63, and monostable multivibrators 64, 65.

Each D flip-flop 60 inverts a clear signal CL to the counter 61 from low to high upon receipt of the main scanning start signal R0 from the main scanning start signal generator 15 (see FIG. 9) so as to cause the counter 61 to start a counting operation. The counter 61 counts the clock signal CK1 from the clock generator 17 when the clear signal CL is high, and sends a count value (binary value) to the comparator 62.

The comparator 62 compares the count value from the counter 61 with a delay amount (binary value) set in advance by the delay setting unit 63. When the count value coincides with the delay amount, the comparator 62 sends a high signal to the monostable multivibrator 64. The delay setting unit 63 includes switches SW1 to SW4 consisting of four bits. The delay amount is set by on or off states of these switches SW1 to SW4. More specifically, the switches SW1 to SW4 input "0" to the comparator 62 as a set value for the four bit delay amount when they are on while inputting "1" when they are off. For example, when the switches SW1, SW3 are set on and the switches SW2, SW4 are set off, a binary value "1010" is input to the comparator 62 as a set value.

Figure 8:
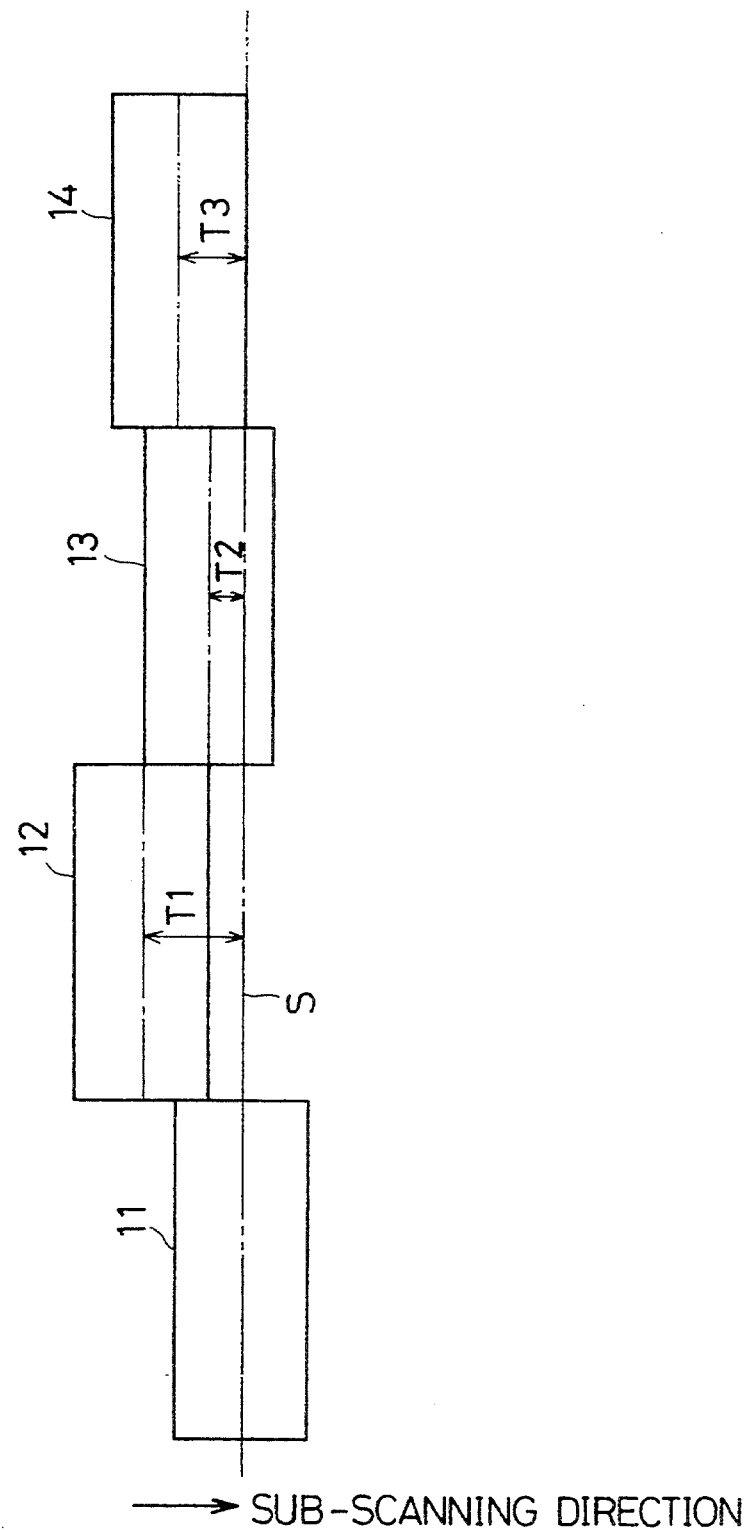
FIG. 8 is a diagram showing an exemplary displacement of arranged image sensors.

There will be described an example of setting in the delay setting unit 63 with reference to FIG. 8. The image sensors 11 to 14 are displaced more toward a downstream side of the sub-scanning direction in the order of the image sensors 11, 13, 14, and 12. The displaced amount is calculated in the following manner, for example. A test pattern including a straight line S written in parallel with the main scanning direction is read by the image sensors 11 to 14, and the image sensor which has carried out the first image reading operation is selected (in this example, the image sensor 11). Then, there are calculated displaced amounts of the other image sensors (in this example, the image sensors 12 to 14) relative to the selected image sensor. More specifically, in FIG. 8, the image sensor 12 reads the straight line image S completely after a period T1 (for example, a period corresponding to 10 cycles of the clock signal CK1) following the reading operation of the image sensor 11. The image sensor 13 reads the straight line image S completely after a period T2 (for example, a period corresponding to 2 cycles of the clock signal CK1) following the reading operation of the image sensor 11. The image sensor 14 reads the straight line image S completely after a period T3 (for example, a period corresponding to 5 cycles of the clock signal CK1) following the reading operation of the image sensor 11.

Thereafter, the set value of the comparator 62 of the delay circuit 16a is set at "0000" by setting the states of the switches SW1 to SW4 of the delay circuit 16a for sending the delayed main scanning start signal R1a to the image sensor 11. Since the delay amount of the delay circuit 16a is zero in this case, the delay circuit 16a sends the main scanning start signal R0 to the image sensor 11 as the delayed main scanning start signal R1a without any delay.

Subsequently, the set value of the comparator of the delay circuit 16b is set at "1010" which corresponds to the period T1 by setting the states of the switches SW1 to SW4. Further, the set value of the comparator 62 of the delay circuit 16c is set at "0010" which corresponds to the period T2 by setting the states of the switches SW1 to SW4. Consequently, the set value of the comparator 62 of the delay circuit 16d is set at "0101" which corresponds to the period T3 by setting the states of the switches SW1 to SW4.

In this way, the document image, e.g. the straight line image S, can be read by the respective image sensors 11 to 14 at the same timing.

The delay circuit corresponding to the image sensor which has first read the straight line image S (the image sensor 11 in FIG. 8) is not required to delay the main scanning start signal R0. In view of this, it may be appropriate to change the wiring such that the main scanning start signal R0 is sent from the main scanning start signal generator 15 directly to the image sensor 11 without passing through the delay circuit 16a. In this case, since the delay circuit 16a can be omitted from the construction, the number of elements can be reduced. Further, it may be also appropriate to give a reference delay amount to the main scanning start signal R0 applied to the image sensor 11 and to add the reference delay amount to the delay amounts of the other delay circuits 16b to 16d.

Upon receipt of the high signal from the comparator 62, the monostable multivibrator 64 sends pulses of a specified pulse duration (delayed main scanning start signals R1a to R1d) to the image sensors 11 to 14 and the monostable multivibrator 65. Upon receipt of the signals R1a to R1d from the monostable multivibrator 64, the monostable multivibrator 65 sends a pulse of a specified pulse duration (reset signal RE) to the D flip-flop 60. Upon receipt of the reset signal RE, the D flip-flop 60 inverts the clear signal CL to applied to the counter 61 from high to low so as to reset the counter 61.

Figure 9:
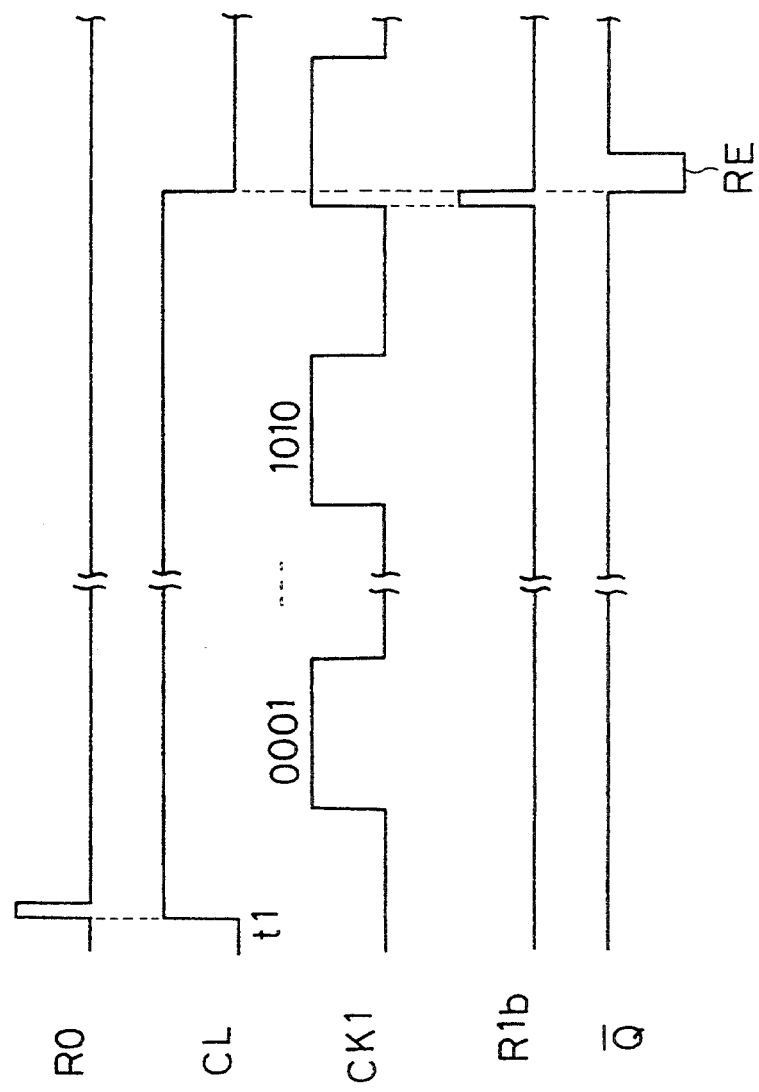
FIG. 9 is a timing chart showing an operation of the delay circuit.

There will be described an exemplary operation of the image reading device next with reference to a timing chart shown in FIG. 9. This operation is described taking the delay circuit 16b corresponding to the image sensor 12 as an example, and it is assumed that the switches SW1 to SW4 are set to output a set value "1010".

When the sub-scanning of the document is started, the main scanning start signal generator 15 sends the main scanning start signals R0 to the respective delay circuits 16a to 16d, for example, at time t1. When the main scanning start signal R0 is applied to the D flip-flop 60 of the delay circuit 16b, the clear signal CL applied from the D flip-flop 60 to the counter 61 is inverted from low to high, causing the counter 61 to start the counting operation. The count value of the counter 62 is output to the comparator 62, which in turn compares the count value with the set value "1010".

If the count value coincides with the set value "1010" the high signal is sent from the comparator 62 to the monostable multivibrator 64. Then, the delayed main scanning start signal R1b is sent from the monostable multivibrator 64 to the image sensor 12, and the light reception data SG of the image sensor 12 are sent to the memory controller 51 sequentially from the first photosensor.

On the other hand, the signal R1b is also sent to the monostable multivibrator 65, which in turn sends the reset signal RE to the D flip-flop 60. Upon receipt of the reset signal RE, the D flip-flop 60 inverts the clear signal CL to be applied to the counter 61 to low level. Thus, the counter 61 is reset. The above operations are repeated each time the main scanning start signal R0 is output from the main scanning start signal generator 15 in the specified cycle.

In this way, the main scanning start signals R0 are delayed according to the displaced amounts between the image sensors 11 to 14 by the delay circuits 16a to 16d. Thus, a satisfactory image can be formed even when the light reception data from the image sensors 11 to 14 are converted into the image almost without exhibiting displacement.

Although the present invention has been fully described by way of example with reference to the accompanying drawings, it is to be understood that various changes and modifications will be apparent to those skilled in the art. Therefore, 1Artless otherwise such changes and modifications depart from the scope of the present invention, they should be construed as being included therein.

What is claimed is:

1. An image reading device which moves relative to a document in a lengthwise direction of the document so as to read a document image, comprising:

first and second image sensors arranged in line in a widthwise direction of the document, each image sensor including first to n-th photoelectric conversion elements arranged in line in the widthwise direction, each photoelectric conversion element receiving reflected light from the document and generating image data corresponding to the intensity of the received reflected light, and the first photoelectric conversion element of the second image sensor positioned following the n-th photoelectric conversion element of the first image sensor;

scan means for causing the lines of photoelectric conversion elements of the respective image sensors to scan in said widthwise direction at a specified speed;

the scan means including scan control means for causing the lines of photoelectric conversion elements of the respective image sensors to scan in a scanning direction from the first to the n-th photoelectric conversion elements cyclically and synchronously;

data processing means for processing the image data from the first and second image sensors so that the image data from the n-th photoelectric conversion element of the first image sensor corresponding to a given scan and the image data from the first photoelectric conversion element of the second image sensor corresponding to said given scan correspond to data on a common line of said document;

the data processing means including memory means consisting essentially of first and second memory blocks;

write means for writing the image data read by the respective image sensors in the memory means in the scanning direction, the write means writing the image data read by the first image sensor during an i-th scanning in the first memory block, writing the image data read by the second image sensor during the i-th scanning in the second memory block, writing the image data read by the first image sensor during an (i+1)-th scanning in the first memory block, and writing the image data read by the second image sensor during the (i+1)-th scanning in the second memory block; and read means for reading the image data stored in these memory blocks, the read means reading the image data of the i-th scanning stored in the first memory block in the writing order and the image data of the (i+1)-th scanning stored in the second memory block synchronously in the writing order.

2. An image reading device as defined in claim 1 wherein:

said scan means includes:

first scan means for causing the line of photoelectric conversion elements of the first image sensor to scan in a specified direction at a specified speed:

second scan means for causing the line of photoelectric conversion elements of the second image sensor to scan in another specified direction at the same speed as the first scan means; and said scan control means controls the scanning timing of said first and second scan means so as to offset a displacement of the second image sensor relative to the first image sensor in the lengthwise direction of the document.

3. An image reading device as defined in claim 2 wherein the scan control means includes:

output means for sending scanning start signals simultaneously to the first and second scan means so as to cause the first and second scan means to start the scanning;

measurement means for measuring a time required to move relatively a displaced amount of the second image sensor relative to the first image sensor in the lengthwise direction of the document; and delay means for sending the scanning start signal to the second scan means at a timing delayed by the measured time from the one at which the scanning start signal is sent to the first scan means.

4. An image reading device as defined in claim 1 further comprising at least one additional image sensor arranged in line with the first and second image sensors in the widthwise direction of the document, the at least one additional image sensor including first to n-th photoelectric conversion elements arranged in line in the widthwise direction of the document.

* * * * *